Aug. 31, 1943. F. C. NELSON 2,328,390
PISTON AND RING ASSEMBLY
Filed Sept. 18, 1941

Inventor
FRED C NELSON

Patented Aug. 31, 1943

2,328,390

UNITED STATES PATENT OFFICE 2,328,390

PISTON AND RING ASSEMBLY

Fred C. Nelson, St. Paul, Minn.

Application September 18, 1941, Serial No. 411,349

2 Claims. (Cl. 309—27)

This invention relates to an improvement in piston and ring assemblies for internal combustion engines and other engines wherein a piston is employed and it is desired to maintain a high compression in the cylinder during the operation of the piston therein. This application is a continuation in part of applicant's earlier application, Serial No. 186,489, filed January 24, 1938.

My piston and ring assembly is adapted to operate very successfully in Diesel engines and other internal combustion engines to maintain the piston held centrally within the bore of the cylinder and cushioned to overcome piston slap. Thus my piston and ring assembly operate to maintain a high compression within the engine cylinders for a long time or until the compression rings are worn out.

It is a feature to provide a piston ring assembly wherein the piston is formed with ring groove means in its body, provided with upper and lower parallel walls, one of said walls being cut away at the periphery of the groove to form a beveled face. The ring assembly includes a compression ring triangular in cross section and has its outer corners arcuated with a flat surface of the triangle engaging the cylinder wall while the arcuated corners prevent the ring from scraping the cylinder wall dry of the lubricating oil, thus permitting free lubrication of the cylinder wall during the rapid reciprocation of the piston.

Further, the compression ring is adapted to be held under spring tension by a spring compensating ring which fills the space between the parallel walls of the ring groove so that this spring compensating ring may move horizontally in the ring groove to maintain spring tension against one of the beveled surfaces of the compression ring, holding the opposite beveled surface of the compression ring against the beveled surface formed in the periphery of the ring groove.

It is a feature to provide a spring compensating ring which is held with a bearing surface on the parallel walls of the ring groove and at the same time holds the compression ring under spring tension against the cylinder wall and with the other two walls of the compression ring bearing one against the beveled surface in the ring groove and the other beveled surface against the bevel formed in the compensating ring. Thus I provide a piston and ring assembly which prevents blow-by over the back of the compression ring or along its face owing to the fact that the spring compensating ring always maintains a spring tension against the compression ring and none of the surfaces in the ring groove are ever open with a gap such as occurs in the piston and ring assemblies of ordinary piston construction. At no time does the compensating ring expand to contact the wall of the cylinder. The spring compensating ring is held compressed to a smaller diameter than the outer diameter of the piston. Thus it is a feature to provide a piston and ring assembly wherein the spring compensating ring is held between and contacts two parallel guide walls so that the spring compensating ring is always maintained squarely in position in the groove in which it operates. Further, by holding the compensating ring compressed to a smaller diameter than the diameter of the piston, the compensating ring never contacts the cylinder wall and is caused to operate against the compression ring in position to maintain a seal between the wall of the cylinder and the beveled surface of the piston which the compression ring engages at all times.

While I have found that a bevel of approximately 30° for the compression bearings on the body of the piston and the spring compensating rings gives the best results, the angle of the bevel may be varied as the case may require to accomplish the same results of providing a centralizing means for the piston and a spring means for holding the compression rings bearing against the cylinder wall and the beveled surface in the ring groove at just the right degree of tension. If the spring tension of the compensating ring is too great, then the compression rings bear too heavily against the cylinder wall, and if the tension of the compensating ring is not enough, then the compression in the cylinder head is not obtained in the operation of the piston.

My piston and ring assembly may be used for air compressors and applied to other uses where a reciprocating piston is used with compression rings to maintain or build up a high compression.

With my piston and ring assembly, I provide a means of centralizing the piston in the cylinder and of obtaining a high compression in the cylinder head in the operation of the piston without undue wear on the cylinder walls or compression rings, and by a ring assembly which has a sealed joint back of the rings, thereby preventing carbon from working between and back of the rings to keep the piston with the ring assembly working at its greatest efficiency.

These features, together with other details and objects of my invention will be more fully and clearly hereinafter set forth.

Figure 1:
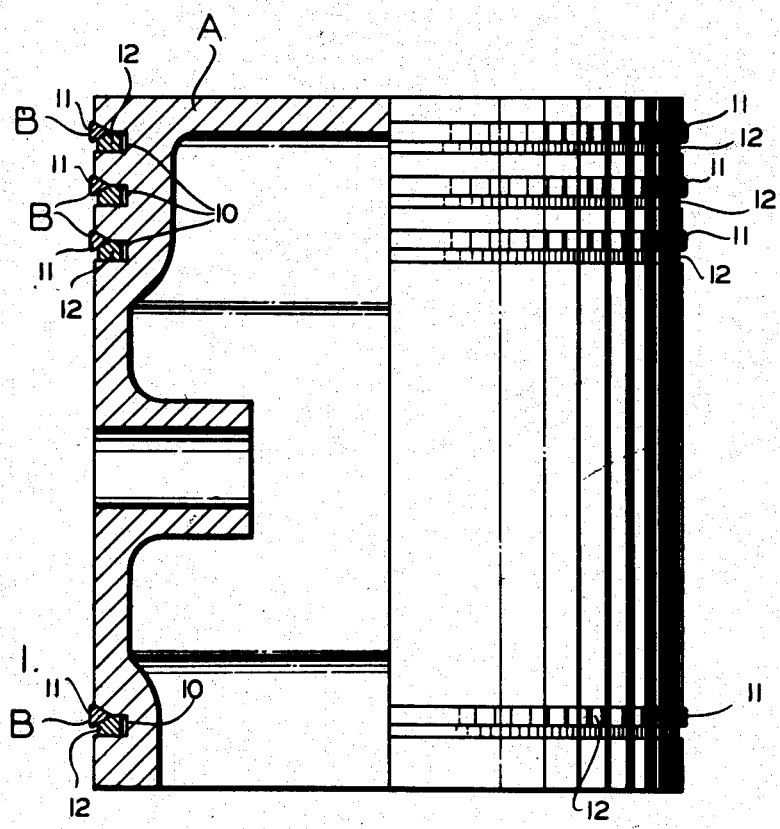
Figure 1 is a side elevation of my piston and ring assembly, one-half of which is shown in longitudinal central cross-section through the wrist pin boss.

The piston A may be of any desired size and formed of any suitable material. The piston A is formed with ring grooves 10 in the head and skirt of the same.

The ring assembly B for each ring groove 10 is made up of the compression ring 11 and the spring compensating ring 12. The compression ring 11 is virtually triangular in cross section and is formed with arcuated corners 13 which permit the flat surface 14 of the compression ring to ride flat against the cylinder wall without causing the corners of the ring to act as a scraper means to remove the lubricating oil from the cylinder wall 15 during the reciprocation of the piston A.

The inner beveled wall 16 of the compression ring 11 bears against the complemental beveled surface 17 formed in the periphery of the ring groove 10 while the other beveled surface 18 of the ring 11 bears against the beveled surface 19 formed on the outer corner of the spring compensating ring 12.

The spring compensating ring 12 is formed with parallel sides 20 and 21 which ride against the parallel sides 22 and 23 in the ring groove 10. Thus the compensating ring 12 is formed to fit the space between the walls 22 and 23 with a close sliding fit so that the walls 22 and 23 act as bearing means for guiding the horizontal movement of the spring compensating ring 12. The arrows in Figure 2 show the relative horizontal outer movement of the ring toward the compression ring 11.

Figure 2:
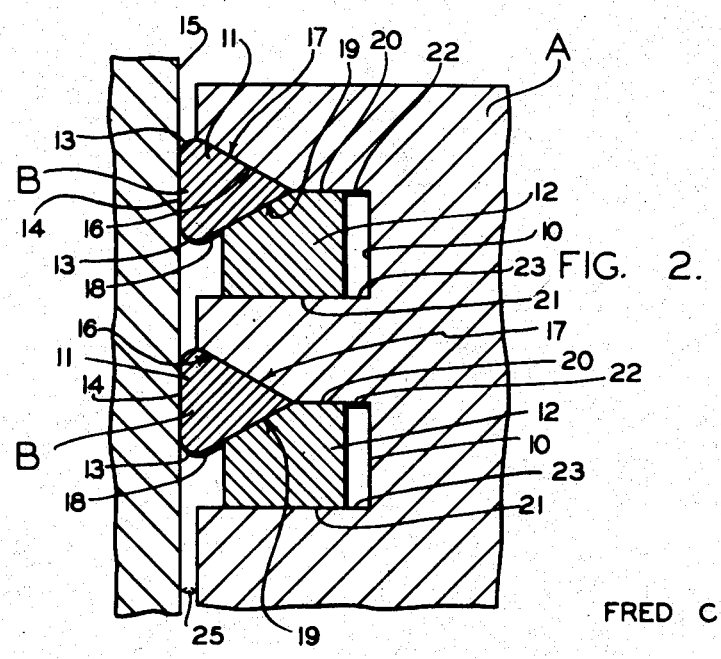
Figure 2 is an enlarged detail cross section through the piston, ring assembly and cylinder wall, showing the relative position of the parts in a cylinder, only a portion of which is shown.

The ring assembly B with the compression ring 11 and the spring compensating ring 12 is positioned in the ring grooves 10 of the piston A with the spring compensating ring 12 compressed as illustrated in Figures 1 and 2 by the compression ring. In this assembled position, the compensating ring 12 is pressed back in the ring groove 10 to a diameter smaller than the diameter of the piston A, in which manner the compensating ring is held by the compression ring 11. With the compensating ring 12 held compressed in this manner, it is caused to exert spring tension against the compression ring 14 through contact with the wall 18 of the same, causing the compression ring 14 to bear with spring tension against the wall 17 of the piston while the horizontal walls of the compression ring 12 bear against the parallel walls 22 and 23.

With my piston A and ring assemblies B properly positioned in the head and on the skirt of the piston, the piston is maintained in a central co-axial position in the cylinder with a clearance of from approximately .045 to .050, as illustrated at 25 in Figure 2, and yet being operable without any piston slap owing to the fact that my ring assembly balances the piston in the cylinder. The importance of this structure will be more clearly apparent when considering its application to the large Diesel engine pistons which are used for railroad locomotives, and for other purposes where large pistons are required to obtain the desired horse power from the engine. It will also be apparent that it is of primary importance that the compensating rings 12 be firmly held in the ring grooves 10 without play and with only sufficient clearance to permit these rings to reciprocate horizontally to compensate for the wear of the compression rings 11 and to maintain the rings 11 in position to keep the compression in the cylinders in the operation of the engine. My piston and ring assembly provide a structure which cushions the piston in the cylinder in its operation. Further, by maintaining the spring compensating rings 12 wholly within the ring grooves 10 so that they cannot contact the wall 15 of the cylinder but are free to operate with spring tension against the compression rings 11, it will be apparent that the full efficiency of the compensating rings 12 is always maintained against the compression rings 11.

Therefore, my ring assembly B operated in the ring groove 10 of the piston A, provides a piston and ring assembly which will operate efficiently under the severe requirements of pistons in Diesel engines, air compressors and other devices were a piston with compression ring assemblies are required for long wear and which must maintain a uniform compression for a long period of time.

In the present construction of pistons and ring assemblies, the piston is not held co-axially in the cylinder with a uniform clearance about the body of the piston with the cylinder wall, and particularly where no undue wear is caused against the cylinder walls and the compression rings. While others have tried to accomplish this result by various constructions, they have not provided a simple ring assembly wherein the spring compensating ring is held firmly between the parallel walls of the ring groove and as a sole means of holding the compression ring with the proper tension against the cylinder wall and against a beveled wall formed in the ring groove. My ring assembly accomplishes these results in a simple and effective manner and thus prevents undue wear on the cylinder wall, yet maintains high compression for a long period of time in the cylinder, or until the compression rings are worn out and require replacement. Here again, I provide a ring assembly which is very desirable, because when the compression rings 11 are worn out, the compensating rings 12 may still be used and it is only necessary to replace the compression rings.

The spring compensating rings in my ring assembly are long wearing because carbon and foreign matter cannot enter behind or between this compensating ring, and the body of the piston or ring groove. I have found in the operation of my piston and ring assembly, that the beveled surface 17, the wall surfaces 22 and 23, and the beveled surfaces 16 and 18 of the compression ring, as well as the beveled surface 19 of the compensating ring, are maintained bright and clean during continuous operation in heavy duty Diesel engines where old types of pistons and ring assemblies did not operate successfully but required replacement in a comparatively short period of time, and then did not satisfactorily maintain compression within the cylinders.

I claim:

1. In a piston having a groove in the peripheral wall thereof, the upper and lower walls of said groove being parallel, the upper wall of said groove being of a lesser length than the lower wall and terminating at its forward end in an upwardly beveled face extending to the periphery of the piston, a spring compensating ring fitted in said groove with its top and bottom faces contacting the top and bottom walls of the latter and of a depth less than the depth of said groove, the top face of said ring being beveled forwardly and downwardly from a point slightly rearward of the center toward the front face thereof, and a compression ring substantially triangular in cross section having its inclined faces contacting respectively the beveled faces of the groove and said spring compensating ring, the angularity of the beveled faces of said groove, spring compensating ring and compression ring being such as to permit the outer peripheral face of said compression ring to normally project beyond the peripheral wall of said piston, whereby only the compression ring will normally contact the wall of a cylinder and the spring compensating ring will remain wholly within said groove.

2. A piston having a groove in the peripheral wall thereof, the upper and lower walls of said groove being parallel and the upper wall having a depth of less than one-half of the depth of the groove, the forward end of the upper wall terminating in a beveled face inclined upwardly and extending to the periphery of the piston, a spring compensating ring fitted in said groove and of a depth materially less than the depth of said groove to be wholly received within the latter, said ring having its top and bottom faces in contact with the top and bottom walls of said groove, and the top face of said ring from a point rearward of the center thereof being beveled forwardly and downwardly toward the front face of said ring, the bevel of said ring being at the same angle from the horizontal as the inclined face of said groove and opposite thereto, and a compression ring having its top and bottom faces beveled from the outer toward the inner periphery thereof to form substantially an equilateral triangle in cross-section, said inclined faces of the compression ring being in contact with the inclined faces of said groove and spring compensating ring, respectively, and the depth of said compression ring measured on the perpendicular between the outer periphery thereof and the opposite angle being such that in normal position said outer periphery of the compression ring projects beyond the periphery of the piston and the spring compensating ring retained wholly within said groove.

FRED C. NELSON.